United States Patent [19]

Gruaz

[11] 4,054,637

[45] Oct. 18, 1977

[54] PROCESS FOR MANUFACTURING PLASTIC CARTRIDGE CASES

[76] Inventor: Eric Gruaz, 4, Av. Marechal Foch, Lyon 6eme, Rhone, France

[21] Appl. No.: 633,505

[22] Filed: Nov. 19, 1975

[30] Foreign Application Priority Data

Dec. 3, 1974 France .................................. 74.40723

[51] Int. Cl.² ............................................. B29F 5/00
[52] U.S. Cl. ................................. 264/296; 264/320; 264/322
[58] Field of Search ............... 264/322, 296, 320, 294, 264/295, 323; 425/394, 398, 400

[56] References Cited

U.S. PATENT DOCUMENTS

| 3,234,310 | 2/1966 | Edwards .......................... 264/296 X |
| 3,342,915 | 9/1967 | Wanderer ........................ 264/322 X |

*Primary Examiner*—Richard R. Kucia
*Attorney, Agent, or Firm*—Browdy & Neimark

[57] ABSTRACT

A method for manufacturing a plastic cartridge case having a hollow peripheral flange which protrudes radially from the base of the cartridge case, utilizes the principle of heating a plastic tubular element closed at the base and exerting axial pressure against a housing which acts as a mold and limits the deformation of the element.

5 Claims, 7 Drawing Figures

PROCESS FOR MANUFACTURING PLASTIC CARTRIDGE CASES

FIELD OF THE INVENTION

The present invention relates to methods for manufacturing cartridge cases and, more particularly, for manufacturing plastic cartridge cases having a hollow peripheral flange at the base.

BACKGROUND OF THE INVENTION

Cartridge cases for blanks, small-caliber ammunition or charges for sealing guns or captive-bolt pistols or the like are traditionally made of metal and are provided at their bases with a hollow peripheral flange into which the explosive is packed, allowing annular percussion. Thus, in order to accomplish annular percussion, the cartridge case must be provided at its base with a hollow flange containing explosive. FIG. 1 shows such a cartridge containing explosive 2, where reference 1 indicates the barrel of a gun and 3 indicates the hammer.

SUMMARY OF THE INVENTION

The object of the present invention is a method for the manufacture of a new type of cartridge case made of plastic, provided at its base with a hollow peripheral flange.

In view of the fact that it is technically impossible to manufacture such a cartridge case of plastic by traditional molding means in view of the impossibility of releasing both the core and the formed part, the invention applies to the process for manufacturing such a cartridge case.

This method consists first of all in producing a cylindrical element of plastic, closed at one end by a bottom, then heating the bottom and possibly the zone near the latter, while exerting an axial pressure on this element, the element being located during the operation in a housing which limits its deformation and acts as a mold.

Due to the softening of the bottom of the cylindrical element by virtue of the fact that the latter is heated, and due to the axial pressure exerted on the cylindrical element, the bottom of the cylindrical element is deformed and develops a peripheral flange which protrudes relative to the cylindrical part. For this purpose, the travel of the piston causing the axial compression of the element is controlled so as to deform the latter in a predetermined manner, allowing deformation of the flange. It is obvious that the heat must be controlled with high accuracy in order to bring the material composing the element to the softening point and not to the melting point.

The apparatus for accomplishing this process consists of a tubular mold intended to hold the element laterally and two members mounted on opposite sides of the opening of the mold, one of which is fixed during the molding operation and serves to hold one end of the cylindrical element, while the other is mobile, serving for the axial compression of the element, a peripheral recess allowing the formation of a flange at the closed end of the element.

In any event, the invention will be well understood with the aid of the following description, with reference to the schematic diagram appended, which shows as nonlimiting examples, two embodiments of the apparatus for accomplishing this process.

DETAILED DESCRIPTION OF PREFERRED EMBODIMENTS

Figure 1:
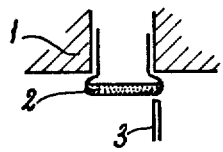
FIG. 1 is a schematic cross section of a cartridge case having a hollow flange, in the barrel of a gun.
Figure 2:
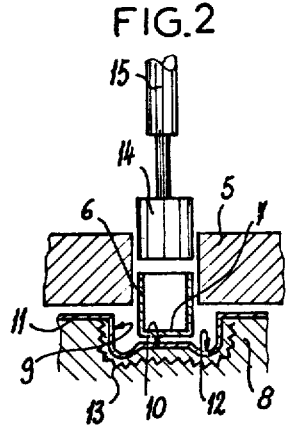
FIG. 2 is a cross section of a first apparatus prior to compression of the cylindrical element.
Figure 3:
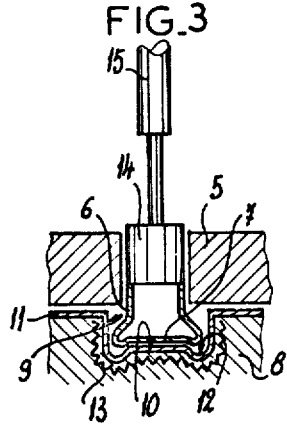
FIG. 3 is a view similar to that in FIG. 2, during compression.
Figure 4:
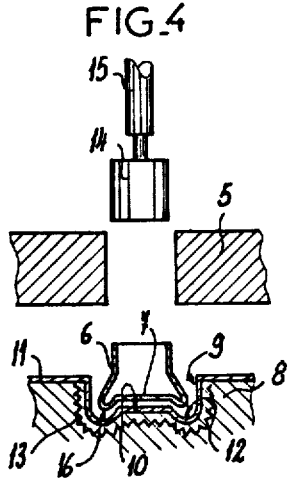
FIG. 4 is a view similar to that in FIG. 4 at the end of the process, during the withdrawal of the finished cartridge case.

The apparatus shown in schematic form in FIGS. 2 to 4 consists of a two-part mold. The first part is tubular part 5 with dimensions corresponding to those of a hollow cylindrical element 6 made of plastic, one end of which is blocked by a bottom 7, and serving for lateral support of said element 6. The second part of the two-part mold is part 8 which contains a tubular area 9 which is coaxial with part 5 and has a cross section slightly larger than the latter, blocked at the end opposite part 5 by a bottom 10, provided with a peripheral recess 12. Part 8 of the mold is provided with electrical heating resistors 13 in its walls and is covered by a layer 11 of a non-adhesive material such as polytetrafluoroethylene. It is clear that the two parts 5 and 8 are mutually displaceable; for this purpose, part 5 is fixed and part 8 is axially displaceable. This apparatus also includes a piston 14, which, mounted at one end of the rod of a jack 15 on the side of part 5 which is opposite part 8, is axially displaceable so as to be able to penetrate tubular part 5 of the mold.

In operation, a cylindrical element 6 is introduced into the mold so that its bottom 7 rests on bottom 10 of part 8 of the mold. Heating resistors 13 associated with a regulating device keep part 8 of the mold at a fixed constant temperature, and the descent of piston 14 is controlled as shown in FIG. 2. The piston comes to rest on the end of the cylindrical element 6 which does not have a bottom, and exerts an axial pressure on the totality of element 6. As shown in FIG. 3, this results in deformation of the heated zone, especially the bottom 7 of the cartridge case, which assumes the shape of bottom 10 of the mold, and particularly recess 12 in the latter, resulting in the formation of a hollow peripheral flange 16 with an absolutely regular shape.

Following the shaping of the cartridge case, piston 14 is caused to retract and part 8 of the mold is displaced relative to part 5. Inasmuch as the mold is vertical, the cartridge case remains in part 8 and it will suffice to displace the latter a distance sufficient to recover the cartridge case.

Figure 5:
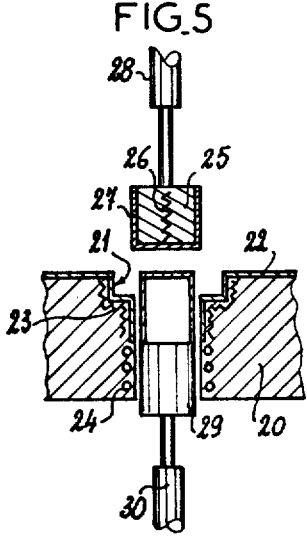
FIGS. 5 to 7 are views corresponding to those in FIGS. 2 to 4, respectively, in the case of an alternative embodiment.
Figure 6:
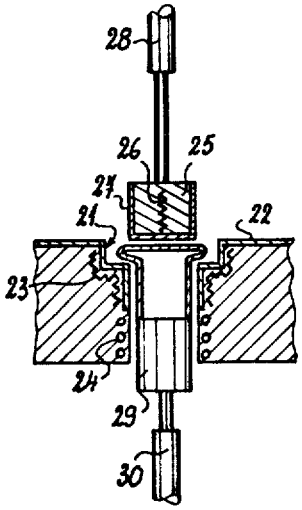
Figure 7:
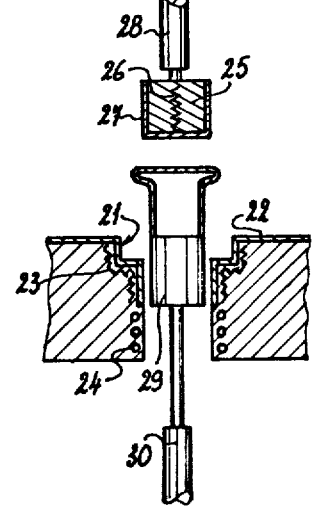

FIGS. 5 to 7 show another embodiment of this apparatus.

The latter consists of a tubular mold 20 which serves to support laterally a cylindrical element 6, which in the embodiment shown in the drawing has its bottom 7 located at the upper part of the mold. This end of the mold is provided with a peripheral recess 21, is covered with a layer 22 of non-adhesive material such as polytetrafluoroethylene, and is optionally provided with heating resistors 23 in its wall. The other end of the mold 20 may or may not be provided with a cooling circuit 24.

This apparatus also embodies a first piston 25, provided with heating resistors 26 in its wall and covered with a layer 27 of polytetrafluoroethylene. The first piston is at one end of the rod of a jack 28 so as to be axially displaceable with respect to the mold, and to be able to rest on the bottom of element 6. A second piston 29 acts on the opposite side of the mold, the second piston being mounted at the end of the rod of a jack 30, so as to be axially displaceable with respect to the mold and to be capable of being stopped in any desired position.

In operation, the cylindrical element 6 is introduced into the mold so that its open end comes to rest against piston 29, the latter being fixed, as shown in FIG. 5. When the mold is at the desired temperature, piston 25 is caused to be displaced as shown in FIG. 6, resulting in the formation of hollow flange 16. In a final stage, shown in FIG. 7, piston 25 is withdrawn, after which piston 29 is caused to advance, resulting in the latter acting as an ejector.

Although this process is particularly appropriate for the manufacture of polypropylene cartridge cases, it will suffice for many types of plastic materials, especially vinyl chloride, polyamides, polyethylene, etc.

Of course, the invention is not limited to the implementation of this process and only to the device described above in the way of example; on the contrary, it includes all types of alternative embodiments. Thus, in particular, in the apparatus shown in FIGS. 2 to 4, part 8 of the mold could be provided with an ejector which traverses its bottom 10 axially during the period of utilization. Likewise, the apparatus for accomplishing the process according to the invention, which has been described for the case of a single mold, in other words, allowing only a single cartridge case to be made at a time, could also contain a multiple mold, without departing from the scope of the invention. It is likewise possible to provide an intermittent heating function. In this case, a single control is provided for the means of compressing the cylindrical element and the heating means, the important point being that the latter are controlled so as to ensure a satisfactory temperature in the mold.

Accordingly, various changes may be made without departing from the scope of the invention and the invention is not to be considered limited to what is shown in the drawings and described in the specification.

What is claimed is:

1. A process for manufacturing a plastic cartridge case having a hollow peripheral flange which protrudes radially from the base of the cartridge case, comprising:

heating at least the bottom of a tubular element of plastic closed at the base by a bottom, to a temperature at which the plastic is softened but not melted, and exerting a controlled axial pressure on the cylindrical part of the element, during said heating step, against a housing which acts as a mold which laterally supports the cylindrical part of the element and limits the deformation of the element, said pressure being so controlled and said housing being so shaped as to permit the formation of said hollow peripheral radially protruding flange.

2. A process in accordance with claim 1 wherein said axial pressure is exerted on the open end of the cylindrical element.

3. A process in accordance with claim 1 wherein said axial pressure is exerted on the closed end of the cylindrical element.

4. A process in accordance with claim 1 wherein only the bottom and the area adjacent thereto are heated.

5. A process in accordance with claim 1 further comprising the initial step, prior to said heating step, of producing a rigid cylindrical element of plastic, closed at one end by a bottom and using said element so produced as said tubular element in said heating and exerting steps.

* * * * *